United States Patent
Chu et al.

(10) Patent No.: US 11,044,726 B1
(45) Date of Patent: Jun. 22, 2021

(54) SELECTION OF TRANSMISSION PARAMETERS FOR ACKNOWLEDGMENT PACKETS

(71) Applicant: Marvell International Ltd., Hamilton (BM)

(72) Inventors: Liwen Chu, San Ramon, CA (US); Xiayu Zheng, San Jose, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 53 days.

(21) Appl. No.: 15/867,501

(22) Filed: Jan. 10, 2018

Related U.S. Application Data

(60) Provisional application No. 62/444,500, filed on Jan. 10, 2017.

(51) Int. Cl.
*H04W 72/04* (2009.01)
*H04L 5/00* (2006.01)
*H04W 84/12* (2009.01)

(52) U.S. Cl.
CPC ....... *H04W 72/0453* (2013.01); *H04L 5/0055* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2008/0137577 A1* | 6/2008 | Habetha | ................ | H04W 52/24 370/311 |
| 2011/0182201 A1* | 7/2011 | Pajukoski | .............. | H04B 17/24 370/252 |
| 2012/0106490 A1* | 5/2012 | Nakashima | ........... | H04W 52/42 370/329 |
| 2013/0301569 A1* | 11/2013 | Wang | .................... | H04L 5/0055 370/329 |
| 2014/0164864 A1* | 6/2014 | Takeda | ................. | H04L 5/0055 714/749 |
| 2015/0029981 A1* | 1/2015 | Takahashi | ............. | H04W 74/08 370/329 |
| 2016/0286419 A1* | 9/2016 | Liu | ................... | H04W 72/0446 |

(Continued)

OTHER PUBLICATIONS

Roger Pierre Fabris Hoefel—IEEE 802.11ax: Performance of OFDM Uplink Multi-User MIMO over Non-Ideal Scenarios—Aug. 30 to Sep. 2, 2016 (Year: 2016).*

(Continued)

*Primary Examiner* — Kodzovi Acolatse
*Assistant Examiner* — The Hy Nguyen

(57) ABSTRACT

In a wireless communication network that operates according to a communication protocol that permits transmissions via multiple channels corresponding to multiple different frequency bandwidths, a communication device receives a packet via a first communication channel that spans a first frequency bandwidth. The communication device determines a second communication channel for transmitting an acknowledgment packet, the second communication channel spanning a second frequency bandwidth that is less than the first frequency bandwidth, the acknowledgment packet responsive to receiving the packet. The communication device transmits the acknowledgment packet via the second communication channel.

24 Claims, 3 Drawing Sheets

(56) References Cited

U.S. PATENT DOCUMENTS

| | | | | |
|---|---|---|---|---|
| 2017/0111893 | A1* | 4/2017 | Lu | H04L 1/16 |
| 2017/0117991 | A1* | 4/2017 | Liu | H04L 1/0006 |
| 2017/0171853 | A1* | 6/2017 | Lindoff | H04W 48/16 |
| 2017/0202015 | A1* | 7/2017 | Li | H04W 74/02 |
| 2017/0290045 | A1* | 10/2017 | Nair | H04B 7/0452 |
| 2018/0176869 | A1* | 6/2018 | Aryafar | H04W 76/10 |
| 2019/0110285 | A1* | 4/2019 | Huang | H04L 5/0055 |
| 2019/0190645 | A1* | 6/2019 | Sano | H04W 52/28 |

OTHER PUBLICATIONS

IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

\* cited by examiner

SELECTION OF TRANSMISSION PARAMETERS FOR ACKNOWLEDGMENT PACKETS

CROSS REFERENCES TO RELATED APPLICATIONS

This application claims the benefit of U.S. Provisional Patent Application No. 62/444,500, entitled "TXOP Bandwidth (BW), MCS/Rate Selection and A-MPDU Content," filed on Jan. 10, 2017, which is hereby incorporated herein by reference in its entirety.

FIELD OF TECHNOLOGY

The present disclosure relates generally to wireless communication systems, and more particularly to selection of transmission modes in a wireless communication network.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method is performed in a wireless communication network that operates according to a communication protocol that permits transmissions via multiple channels corresponding to multiple different frequency bandwidths. The method includes: receiving, at a communication device, a packet via a first communication channel that spans a first frequency bandwidth; determining, at the communication device, a second communication channel for transmitting an acknowledgment packet, the second communication channel spanning a second frequency bandwidth that is less than the first frequency bandwidth, the acknowledgment packet responsive to receiving the packet; and transmitting, by the communication device, the acknowledgment packet via the second communication channel.

In another embodiment, an apparatus comprises: a network interface device associated with a first communication device. The network interface device includes one or more integrated circuits (ICs) configured to: in connection with the first communication device receiving a packet via a first communication channel that spans a first frequency bandwidth, determine a second communication channel for transmitting an acknowledgment packet, the second communication channel spanning a second frequency bandwidth that is less than the first frequency bandwidth, the acknowledgment packet responsive to receiving the packet; and transmit the acknowledgment packet via the second communication channel.

In yet another embodiment, a method is performed in a wireless communication network that operates according to a communication protocol that permits transmissions via multiple channels corresponding to multiple different frequency bandwidths. The method includes: determining, at a first communication device, a frequency bandwidth that a second communication device is to use when the second communication device transmits an acknowledgment packet; and transmitting, by the first communication device to the second communication device, an indication of the frequency bandwidth that the second communication device is to use when the second communication device transmits the acknowledgment packet.

In still another embodiment, an apparatus comprises: a network interface device associated with a first communication device. The network interface device includes one or more ICs configured to: determine a frequency bandwidth that a second communication device is to use when the second communication device transmits an acknowledgment packet; and transmit, to the second communication device, an indication of the frequency bandwidth that the second communication device is to use when the second communication device transmits the acknowledgment packet.

DETAILED DESCRIPTION

In embodiments described below, a communication device determines one or more transmission parameters for transmission of an acknowledgment packet. For example, in some embodiments, a packet (which is to be acknowledged) is received via a first communication channel having a first frequency bandwidth, and the communication device determines a second communication channel for transmitting the acknowledgment packet, the second communication channel having a second frequency bandwidth that is narrower than the first frequency bandwidth. In embodiments in which the communication device has limited transmit power capability, permitting the communication device to transmit the acknowledgment packet via the narrower second communication channel facilitates better reception of the acknowledgment packet because the transmit power is not spread over the wider first communication channel.

In some embodiments, a communication protocol specifies a set of modulation schemes (and/or a set of modulation and coding schemes (MCSs)) that can be used, and a rule for determining a first modulation scheme (or first MCS) to use for an acknowledgment packet, where the rule specifies the first modulation scheme (or first MCS) for the acknowledgment packet based on a second modulation scheme (or a second MCS) used in a packet to be acknowledged. In some embodiments, the communication protocol permits an exception to the rule for a communication device that has a limited transmit power capability, permitting the communication device to transmit the acknowledgment packet using a more robust modulation scheme (or MCS) that facilitates better reception of the acknowledgment packet given the limited transmit power.

Figure 1:
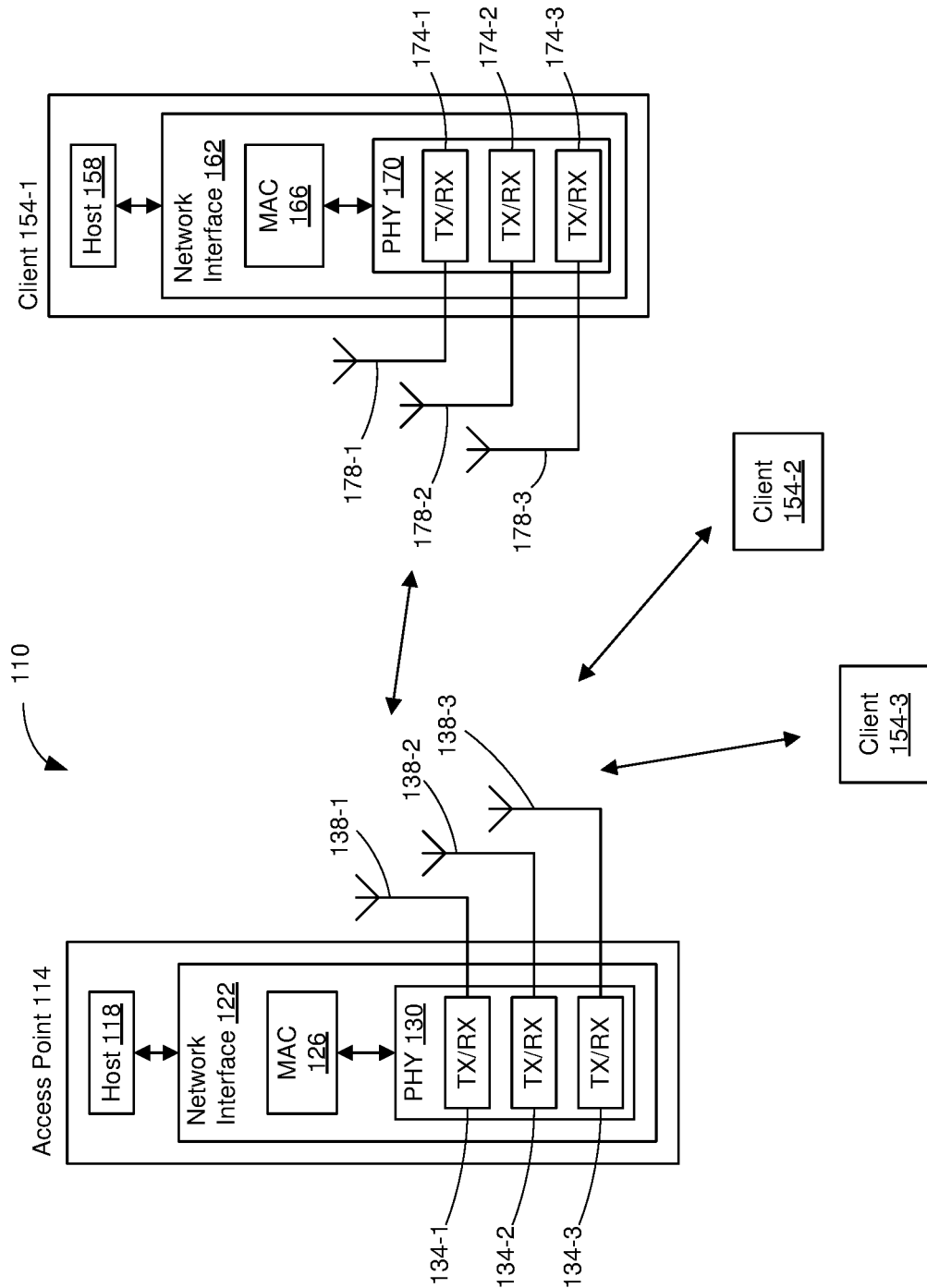
FIG. 1 is a block diagram of an example wireless local area network (WLAN), according to an embodiment.

FIG. 1 is a block diagram of an example wireless local area network (WLAN) 110 that uses one or more transmission mode selection techniques such as described below, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130. In some embodiments, the MAC processor 126 includes a controller (e.g., one or more of a hardware state machine, a processor that executes machine readable instructions stored in a memory included in, or coupled to, the MAC processor 126, etc.).

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170. In some embodiments, the MAC processor 166 includes a controller (e.g., one or more of a hardware state machine, a processor that executes machine readable instructions stored in a memory included in, or coupled to, the MAC processor 166, etc.).

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the WLAN communication protocol defines a set of communication channel bandwidths that can be utilized for transmitting a PPDU. For example, the set comprises 20 MHz, 40 MHz, and 80 MHz bandwidths, according to an illustrative embodiment. As another example, the set comprises 20 MHz, 40 MHz, 80 MHz, and 160 MHz bandwidths, according to another illustrative embodiment. As yet another example, the set comprises 1 MHz, 2 MHz, 4 MHz, 8 MHz, and 16 MHz bandwidths, according to another illustrative embodiment. As yet another example, the set comprises 6 MHz, 12 MHz, and 24 MHz bandwidths, according to another illustrative embodiment. In other embodiments, the set includes other suitable bandwidths.

Transmit power of a transmission at a wider frequency bandwidth is spread across the wider frequency bandwidth, and thus the range of the transmission tends to be shorter as compared to a transmission at a narrower bandwidth.

In an embodiment, the WLAN communication protocol defines a plurality of modulation and coding schemes (MCSs) that can be utilized for a PPDU. Generally, each MCS corresponds to i) a particular modulation scheme, and ii) a particular coding rate (corresponding to a forward error correction code (FEC) scheme), and each MCS corresponds to a different effective data rate. For example, less complex modulation schemes (e.g., binary phase shift keying (BPSK), quaternary phase shift keying (QPSK)) provide more robust transmission reliability but provide a lower data rate as compared to more complex modulations schemes (e.g., 16 constellation point quaternary amplitude modulation (16-QAM), 64-QAM, 256-QAM, etc.). Similarly, lower coding rates (e.g., ½) for FEC provide more robust transmission reliability but provide a lower data rate as compared to higher coding rates (e.g., ¾, ⅚, etc.). A coding rate indicates a ratio of information bits to a total number of bits transmitted, including redundant FEC bits. Thus, the lower coding rates generally correspond to adding more redundant FEC bits as compared to higher coding rates.

In an embodiment, the communication protocol defines an MCS index that communication devices can use to indicate which MCS is used for a particular transmission, where the effective data rate increases as the index value increases. Table 1 is an example listing of MCS index values, with the corresponding modulation schemes and coding rates, according to an embodiment. In other embodiments, one or more other suitable modulation scheme/coding rate combinations are used instead of, or in addition to, the example modulation scheme/coding rate combinations listed in Table 1.

TABLE 1

| MCS Index | Modulation Scheme | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |
| 10 | 1024-QAM | 3/4 |
| 11 | 1024-QAM | 5/6 |

PPDUs transmitted using MCSs corresponding to lower index values (e.g., MCS index=0 (MCS0), MCS1) can be successfully decoded at longer distances as compared to PPDUs transmitted using MCSs corresponding to higher index values (e.g., MCS4-MCS9), at least for a given number of spatial streams and a given frequency bandwidth. Thus, using the lower MCSs, at least for a given number of spatial streams and a given frequency bandwidth, effectively increases the transmission range of a PPDU.

In many scenarios, when a first communication device (e.g., the client station 154-1) receives a packet (e.g., a PPDU) from a second communication device (e.g., the AP 114, the client station 154-2, etc.) and successfully decodes contents of the packet, the first communication device transmits an acknowledgment packet (ACK) (or a block acknowledgment (BA) that acknowledges the packet and one or more other packets) to the second communication device. In an embodiment, the WLAN communication protocol specifies that the first communication device must begin transmitting the ACK within a defined period of time (e.g., a short interframe space (SIFS) define by the IEEE 802.11 Standard, or another suitable time period).

The WLAN communication protocol defines one or more rules regarding transmission parameters according to which the first communication device is to transmit the ACK, according to an embodiment. For example, the WLAN communication protocol defines a first rule that specifies that the first communication device must transmit the ACK via a channel bandwidth that is the same as a channel bandwidth via which the packet that is being acknowledged was transmitted, according to an embodiment. As an illustrative example, if the packet that to be acknowledged was transmitted via a 160 MHz channel, then the first communication device must transmit the ACK via the 160 MHz channel.

As another example, the WLAN communication protocol defines a second rule that specifies an MCS that the first communication device is to use when transmitting the ACK, according to an embodiment. As an illustrative example, when the packet is transmitted using a first MCS, the first communication device must use a second MCS i) that is a highest rate from a basic MCS/basic rate set, and ii) and that is lower than the first MCS, where the basic MCS/basic rate set is a set of MCSs/data rates that are supported by all communication devices in a wireless network.

As another example, the WLAN communication protocol defines a third rule that specifies a modulation scheme that the first communication device is to use when transmitting the ACK, according to an embodiment. As an illustrative example, when the packet is transmitted using a first modulation scheme, the first communication device must use a second modulation scheme i) that is a modulation scheme corresponding to a highest data rate from a basic modulation scheme set, and ii) and that is lower than a data rate corresponding to the first modulation scheme, where the modulation scheme set is a set of modulation schemes that are supported by all communication devices in a wireless network. When a duplicate, non-high throughput (non-HT) PPDU is used to transmit the ACK, the second modulation scheme and a coding rate are selected from a set of MCSs specified in Table 2 so that i) the selected MCS corresponds to a highest data rate from the set specified in Table 2, and ii) and is lower than a data rate corresponding to the first modulation scheme, according to an embodiment. In other embodiments, one or more other suitable modulation scheme/coding rate combinations are used for the duplicate, non-HT PPDU instead of, or in addition to, the example modulation scheme/coding rate combinations listed in Table 2.

TABLE 2

| Modulation Scheme | Coding Rate | Non-HT reference rate (Mb/s) |
|---|---|---|
| BPSK | 1/2 | 6 |
| QPSK | 1/2 | 9 |
| QPSK | 3/4 | 12 |
| 16-QAM | 1/2 | 18 |
| 16-QAM | 3/4 | 24 |
| 64-QAM | 2/3 | 36 |
| 64-QAM | 3/4 | 48 |
| 64-QAM | 5/6 | 48 |
| 256-QAM | 3/4 | 54 |
| 256-QAM | 5/6 | 54 |
| 1024-QAM | 3/4 | 54 |
| 1024-QAM | 5/6 | 54 |

The IEEE 802.11n Standard protocol is sometimes referred to as the high-throughput (HT) WiFi protocol. A duplicate, non-HT PPDU refers to a PPDU formatted according to a legacy communication protocol (legacy with respect to the IEEE 802.11n Standard protocol), e.g., formatted according to the IEEE 802.11a Standard protocol, and duplicated across one or more 20 MHz communication channels such that the PPDU is transmitted over multiple 20 MHz communication channels.

In some embodiments, the WLAN communication protocol permits one or more exceptions to the one or more rules regarding transmission parameters for ACKs. For example, the one or more exceptions permit the use of one or more transmission parameters that facilitate improved reception of ACKs transmitted by communication devices that have limited transmit power capability, according to an embodiment.

Figure 2:
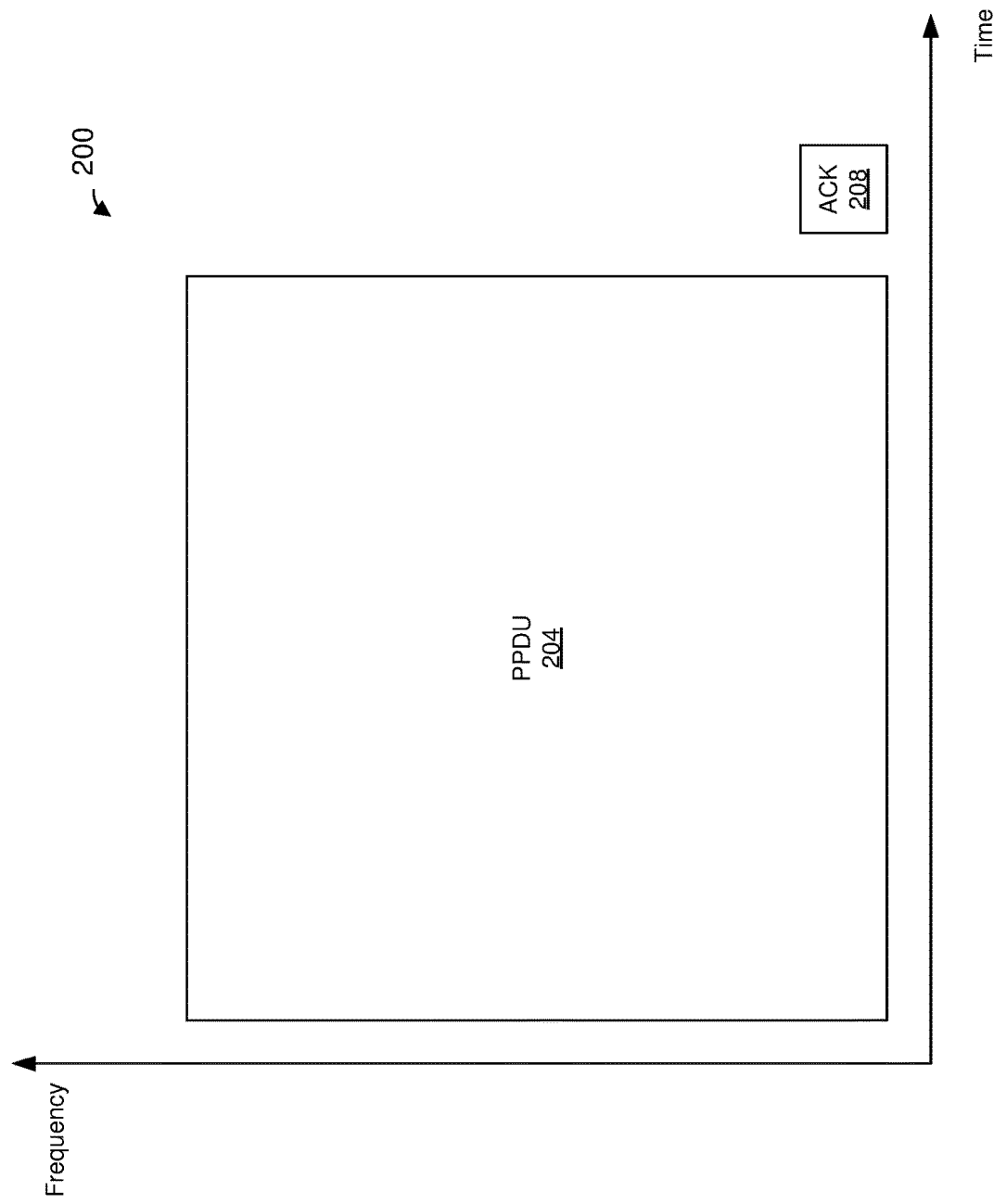
FIG. 2 is a block diagram of an example wireless communication exchange in which a packet is transmitted at a first frequency bandwidth and an acknowledgment packet is transmitted at a second frequency bandwidth that is narrower than the first frequency bandwidth, according to an embodiment.

FIG. 2 is a diagram of an example transmission exchange 200 between a first communication device (e.g., the AP 114, the client station 154-2, etc.) and a second communication device (e.g., the client station 154-1), according to an embodiment. The second communication device 154-1 has a limited transmit power capability, in an embodiment.

The first communication device transmits a PPDU 204 via a first communication channel having a first frequency bandwidth. The second communication device receives the PPDU 204, processes the PPDU 204, and determines that an ACK 208 (e.g., an ACK communication frame included in a PPDU) is to be transmitted. In an embodiment, the WLAN communication protocol defines a rule that specifies ACKs should be transmitted at the same bandwidth as the packet that is to be acknowledged. Thus, according to the rule defined by the WLAN communication protocol, the ACK 208 should be transmitted at the first frequency bandwidth. However, the second communication device determines that the ACK 208 is to be transmitted at a second frequency bandwidth that is narrower than the first frequency bandwidth. For instance, the second communication device has a limited transmit power capability and determines that, to facilitate proper reception of the ACK 208, the second communication device should transmit the ACK 208 at the narrower second frequency bandwidth, according to an embodiment. Thus, transmission of the ACK 208 at the narrower second frequency bandwidth corresponds to an exception to the rule that specifies ACKs should be transmitted at the same bandwidth as the packet that is to be acknowledged. In an embodiment, the WLAN communication protocol defines such an exception.

In an illustrative embodiment, the first frequency bandwidth is 160 MHz and the second frequency bandwidth is 20 MHz. In other embodiments, the first frequency bandwidth is another suitable bandwidth different than 160 MHz and/or the second frequency bandwidth is another suitable bandwidth different than 20 MHz.

Additionally or alternatively, the WLAN communication protocol defines a rule that specifies a particular modulation scheme must be used when transmitting the ACK 208, but the second communication device instead uses another modulation scheme corresponding to a lower data rate, according to another embodiment. For example, when the PPDU 204 is transmitted using a first modulation scheme, the rule specifies that the ACK 208 must be transmitted using a second modulation scheme i) that is a modulation scheme corresponding to a highest data rate from the basic modulation scheme set, and ii) and that is lower than a data rate corresponding to the first modulation scheme. However, because the second communication device has a limited transmit power capability, the second communication device uses a third modulation scheme (from the basic modulation scheme set) that corresponds to a data rate that is lower than the data rate corresponding to the second modulation scheme to facilitate proper reception of the ACK 208. Thus, transmission of the ACK 208 using the third modulation scheme corresponds to an exception to the rule. In an embodiment, the WLAN communication protocol defines such an exception.

Additionally or alternatively, the WLAN communication protocol defines a rule that specifies a particular MCS must be used when transmitting the ACK 208, but the second communication device instead uses another MCS corresponding to a lower data rate, according to another embodiment. For example, when the PPDU 204 is transmitted using a first MCS, the rule specifies that the ACK 208 must be transmitted using a second MCS i) that is an MCS corresponding to a highest data rate from the basic MCS/basic rate set, and ii) and that is lower than a data rate corresponding to the first MCS. However, because the second communication device has a limited transmit power capability, the second communication device uses a third MCS (from the basic MCS/basic rate set) that corresponds to a data rate that is lower than the data rate corresponding to the second MCS to facilitate proper reception of the ACK 208. Thus, transmission of the ACK 208 using the third MCS corresponds to an exception to the rule. In an embodiment, the WLAN communication protocol defines such an exception.

In an embodiment, exceptions for selecting a transmission parameter for an ACK such as described above are permitted when a transmit power capability of the first communication device transmitting the packet (e.g., the PPDU 204) is greater than a transmit power capability of the second communication device transmitting the ACK (e.g., the ACK 208). In an embodiment, exceptions for selecting a transmission parameter for an ACK such as described above are permitted when a transmit power capability of the first communication device transmitting the packet (e.g., the PPDU 204) is greater than a transmit power capability of the second communication device transmitting the ACK (e.g., the ACK 208) by an amount that exceeds a threshold.

In an embodiment, the first communication device transmitting the packet (e.g., the PPDU 204) determines one or more transmit parameters that the second communication device should use when transmitting the ACK (e.g., the ACK 208), and then communicates indication(s) of the one or more transmit parameters to the second communication device. The second communication device then determines the one or more transmit parameters that the second communication device should use when transmitting the ACK (e.g., the ACK 208) using the indication(s) communicated by the first communication device. For example, the first communication device, prior to transmitting the packet (e.g., the PPDU 204)) generates a MAC frame (e.g., a MAC control frame, a MAC management frame, etc.) that includes the indication(s) of the one or more transmit parameters, and transmits the MAC frame (e.g., within a PPDU separate from the PPDU 204) to the second communication device. In another embodiment, the first communication device generates the packet to include the indication(s) of the one or more transmit parameters in the packet itself, e.g. in a High Efficiency (HE) variant HT Control field in a MAC header of an MPDU in the packet.

In another embodiment, the first communication device transmitting the packet (e.g., the PPDU 204) does not determine the one or more transmit parameters that the second communication device should use when transmitting the ACK (e.g., the ACK 208), and does not communicate indication(s) of the one or more transmit parameters to the second communication device. Rather, the second communication device, which transmits the ACK (e.g., the ACK 208), determines the one or more transmit parameters that the second communication device should use when transmitting the ACK.

In an embodiment, the one or more transmit parameters for transmitting the ACK (e.g., the ACK 208) are determined using a transmit power capability of the second communication device, which transmits the ACK (e.g., the ACK 208). In another embodiment, the one or more transmit parameters for transmitting the ACK (e.g., the ACK 208) are determined using i) a transmit power capability of the first communication device, which transmits the packet (e.g., the PPDU 204), and ii) a transmit power capability of the second communication device, which transmits the ACK (e.g., the ACK 208). For example, the one or more transmit parameters for transmitting the ACK (e.g., the ACK 208) are determined using a difference between i) the transmit power capability of the first communication device, which transmits the packet (e.g., the PPDU 204), and ii) the transmit power capability of the second communication device, which transmits the ACK (e.g., the ACK 208). For example, as the difference increases (i.e., as the transmit power capability of the first communication device (e.g., which transmits the PPDU 204) becomes increasingly greater than the transmit power capability of the second communication device (e.g., which transmits the ACK 208)), the permitted frequency bandwidth of the ACK becomes smaller. As another example, as the difference increases (i.e., as the transmit power capability of the first communication device (e.g., which transmits the PPDU 204) becomes increasingly greater than the transmit power capability of the second communication device (e.g., which transmits the ACK 208)), the permitted modulation scheme corresponds to a smaller data rate. As another example, as the difference increases (i.e., as the transmit power capability of the first communication device (e.g., which transmits the PPDU 204) becomes increasingly greater than the transmit power capability of the second communication device (e.g., which transmits the ACK 208)), the permitted MCS corresponds to a smaller data rate.

In an embodiment, the first communication device (e.g., which transmits the PPDU 204) and the second communication device (e.g., which transmits the ACK 208) exchange transmit power capability information via MAC frames such as MAC control frames, MAC management frames, etc. In various embodiments, the first communication device (e.g., which transmits the PPDU 204) and/or the second communication device (e.g., which transmits the ACK 208) communicate the transmit power capability information in one or more of a beacon frame, an association request frame, an association response frame, a reassociation request frame, a reassociation response frame, a probe request frame, a probe response frame, a mesh peering open frame, a mesh peering close frame, etc., each encapsulated in a PPDU. Such exchanges of transmit power capability information occur prior to the communication exchange 200 illustrated in FIG. 2.

In an embodiment, the second communication device determines the one or more transmit parameters for transmitting the ACK (e.g., the ACK 208) by using transmit parameters of previous packets correctly acknowledged by the first communication device. For example, the second communication device transmits a first packet to the first communication device and records transmission parameters of the first packet, e.g. one or more of, an MCS, a data rate, or bandwidth). When the second communication device receives an ACK of the first packet from the first communication device, the second communication device notes that the transmission parameters used for the first packet resulted in a successful transmission. When the first communication device later transmits a second packet to the second communication device, the second communication device uses, for transmission of an ACK of the second packet to the first communication device, the recorded transmission parameters that the first communication device used when transmitting the first packet.

Figure 3:
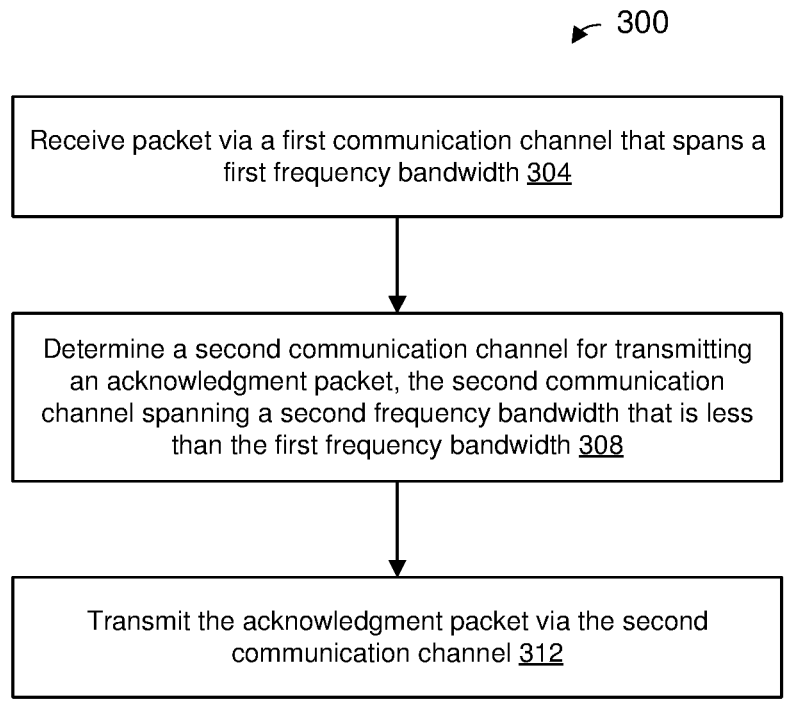
FIG. 3 is a flow diagram of an example method for transmitting an acknowledgment packet, according to an embodiment.

FIG. 3 is a flow diagram of an example method 300 for transmitting an acknowledgment packet, according to an embodiment. In some embodiments, the network interface device 162 of FIG. 1 is configured to implement the method 300, and the method 300 is described in the context of FIG. 1 merely for explanatory purposes. The method 300 is also described in the context of FIG. 2 merely for explanatory purposes. In other embodiments, however, the method 300 is implemented by another suitable communication device different than the network interface device 162 of FIG. 1, and/or in the context of another communication exchange different than the example communication exchange 200 of FIG. 2.

At block 304, a communication device (e.g., the network interface device 162) receives a packet (e.g., the PPDU 204) via a first communication channel that spans a first frequency bandwidth.

At block 308, the communication device (e.g., the network interface device 162) determines a second communication channel for transmitting an acknowledgment packet (e.g., ACK 208), the second communication channel spanning a second frequency bandwidth that is less than the first frequency bandwidth, where the acknowledgment packet is for acknowledging the packet received at block 304.

In an embodiment, a WLAN communication protocol defines a rule that specifies acknowledgment packets should be transmitted at the same bandwidth as the packet that is to be acknowledged. Thus, according to the rule defined by the WLAN communication protocol, the acknowledgment packet should be transmitted at the first frequency bandwidth. However, the communication device determines at block 308 that the acknowledgment packet is to be transmitted at the second frequency bandwidth that is narrower than the first frequency bandwidth.

At block 312, the communication device (e.g., the network interface device 162) transmits the acknowledgment packet via the second communication channel. In an embodiment, the MAC processor 166 performs block 308 and communicates to the PHY processor 170 the second communication channel via which the acknowledgment packet is to be transmitted, and in response the PHY processor 170 generates one or more transmission signals corresponding to the acknowledgment packet spanning the second communication channel. The PHY processor 170 then provides the one or more transmission signals to one or more antennas 178, according to an embodiment.

In an embodiment, the method 300 further includes the communication device receiving an indication of the second frequency bandwidth from another communication device (e.g., the communication device that transmitted the packet received at block 304), and block 308 includes using the indication received from the other communication device to determine the second communication channel for transmitting the acknowledgment.

In an embodiment, block 308 includes using a transmit power capability of the communication device to determine the second communication channel for transmitting the acknowledgment. In another embodiment, block 308 includes using i) a transmit power capability of the communication device, and ii) a transmit power capability of another communication device that transmitted the packet received at block 304, to determine the second communication channel for transmitting the acknowledgment.

In an embodiment, block 308 includes using, to transmit the acknowledgement, a transmission bandwidth of another packet previously transmitted by the communication device and correctly acknowledged by the other communication device (e.g., the communication device that transmitted the packet received at block 304). For example, the second communication channel corresponds to the transmission bandwidth of the other packet that was previously transmitted by the communication device and correctly acknowledged by the other communication device (e.g., the communication device that transmitted the packet received at block 304).

In an embodiment, a communication protocol defines a set of multiple different permitted frequency bandwidths, and block 308 includes selecting the second frequency bandwidth from among the set of multiple different permitted frequency bandwidths.

In another embodiment, the method 300 includes the communication device (e.g., the network interface device 162) determining a modulation scheme for transmitting the acknowledgment packet (e.g., ACK 208. In an embodiment, a WLAN communication protocol defines a rule that specifies acknowledgment packets should be transmitted using a particular modulation scheme (e.g., determined based on a modulation scheme used in the packet that is to be acknowledged). For example, according to the rule defined by the WLAN communication protocol, the acknowledgment packet should be transmitted using a first modulation scheme corresponding to a first data rate. However, the communication device determines that the acknowledgment packet is to be transmitted using a second modulation scheme that corresponds to a second data rate that is slower than the first data rate. In such embodiments, block 312 includes transmitting the acknowledgment packet using the second modulation scheme.

In another embodiment, the method 300 includes the communication device (e.g., the network interface device 162) determining an MCS (e.g., for an HT/VHT/HE PPDU) or a date rate (e.g., for a non-HT PPDU) for transmitting the acknowledgment packet (e.g., ACK 208). The IEEE 802.11ac Standard protocol is sometimes referred to as the very high throughput (VHT) WiFi protocol. The IEEE 802.11ax Standard protocol (now under development) is sometimes referred to as the high efficiency WiFi (HEW or HE) protocol. In an embodiment, a WLAN communication protocol defines a rule that specifies acknowledgment packets should be transmitted using a particular MCS (e.g., determined based on an MCS used in the packet that is to be acknowledged). For example, according to the rule defined by the WLAN communication protocol, the acknowledgment packet should be transmitted using a first MCS corresponding to a first data rate. However, the communication device determines that the acknowledgment packet is to be transmitted using a second MCS that corresponds to a second data rate that is slower than the first data rate. In such embodiments, block 312 includes transmitting the acknowledgment packet using the second MCS.

In some embodiments, block 308 is modified such that determination of a frequency bandwidth is omitted, and determination of a modulation scheme and/or an MCS is included; and block 312 is modified such that the acknowledgment packet is transmitted using the determined modulation scheme and/or the determined MCS and/or the determined data rate.

Figure 4:
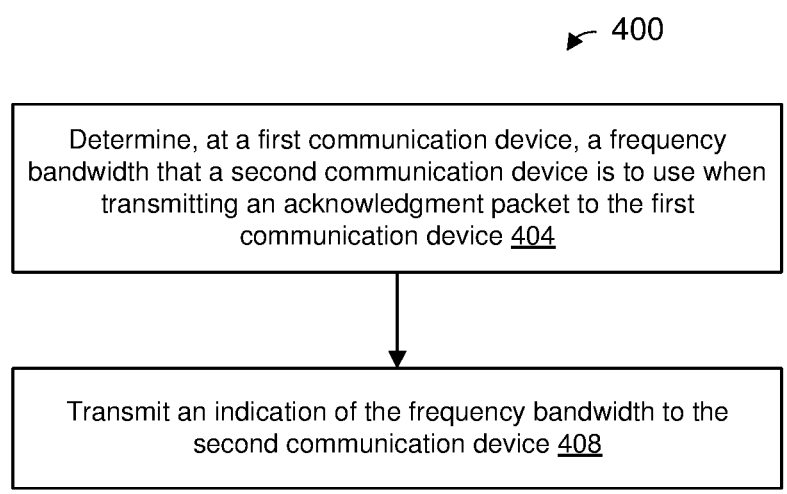
FIG. 4 is a flow diagram of an example method for a first communication device to select a frequency bandwidth that a second communication device is to use when the second communication device transmits an acknowledgment packet, according to an embodiment.

FIG. 4 is a flow diagram of an example method 400 for method for determining a frequency bandwidth for an acknowledgment packet, according to an embodiment. In some embodiments, the network interface device 122 of FIG. 1 is configured to implement the method 400, and the method 400 is described in the context of FIG. 1 merely for explanatory purposes. The method 400 is also described in the context of FIG. 2 merely for explanatory purposes. In other embodiments, however, the method 400 is implemented by another suitable communication device different than the network interface device 122 of FIG. 1, and/or in the context of another communication exchange different than the example communication exchange 200 of FIG. 2.

At block 404, a first communication device (e.g., the network interface device 122) determines a frequency bandwidth that a second communication device (e.g., the client station 154-1) is to use when transmitting an acknowledgment packet (e.g., ACK 208), where the acknowledgment packet is for acknowledging a packet (e.g., PPDU 204) transmitted by the first communication device to the second communication device.

In an embodiment, a WLAN communication protocol defines a rule that specifies acknowledgment packets should be transmitted at the same frequency bandwidth as the packet that is to be acknowledged. However, the first communication device determines at block 404 that the acknowledgment packet is to be transmitted at a frequency bandwidth that may be narrower than the frequency bandwidth at which the packet to be acknowledged is transmitted.

At block 408, the first communication device transmits an indication of the frequency bandwidth (determined at block 404) to the second communication device. In an embodiment, the MAC processor 126 performs block 404; the MAC processor 126 generates a MAC frame that includes the indication of the frequency bandwidth, and provides the MAC frame to the PHY processor 130. In response the PHY processor 170 encapsulates the MAC frame in a PPDU and generates one or more transmission signals corresponding to the PPDU. The PHY processor 130 then provides the one or more transmission signals to one or more antennas 138, according to an embodiment.

In some embodiments, the method 400 includes the first communication device determining a modulation scheme and/or an MCS that the second communication device (e.g., the client station 154-1) is to use when transmitting the acknowledgment packet (e.g., ACK 208). In an embodiment, a WLAN communication protocol defines one or more rules that specifies acknowledgment packets should be transmitted using a particular modulation scheme and/or a particular MCS. However, the first communication device determines that the acknowledgment packet is to be transmitted at using a modulation scheme and/or an MCS corresponding to a data rate that is slower than the data rate corresponding to the modulation scheme/MCS specified by the rule.

In an embodiment, block 404 is modified such that determination of a frequency bandwidth is omitted, and determination of a modulation scheme and/or an MCS and/or a data rate is included; and block 408 is modified such that one or more indications of the modulation scheme and/or the MCS and/or the data rate are transmitted to the second communication device.

In some wireless communication networks, multi-user (MU) communication techniques that involve simultaneous transmissions to or from multiple communication devices are used to increase system throughput. Examples of MU communication techniques include MU multiple input, multiple output (MIMO) (MU-MIMO) techniques and orthogonal frequency division multiple access (OFDMA) techniques. In some embodiments, multiple client stations 154 transmit simultaneously to the AP 114 as part of an UL MU transmission (e.g., an UL MU transmission that utilizes MU-MIMO and/or OFDMA). The AP 114 (e.g., the network interface 122) transmits a trigger frame (e.g., a type of MAC frame, which is included in a PPDU) to prompt the client stations 154 to begin transmitting as part of the UL MU transmission. For example, a trigger frame (included in a downlink (DL) PPDU) is configured to prompt a group of client stations 154 to begin transmitting a suitable time period after an end of the DL PPDU.

In an embodiment, the WLAN communication protocol defines a plurality of different types of trigger frames for different purposes. In an embodiment, the plurality of types of trigger frames includes a first type referred to as a "basic trigger". In some embodiments, the plurality of types of trigger frames also includes one of, or any suitable combination of two or more of, a trigger for polling client stations 154 for beamforming training feedback (referred to as referred to as a "beamforming report poll trigger"), a trigger for requesting an MU block acknowledgment (an MU block acknowledgment request (MU-BAR) trigger), a trigger corresponding to an MU request-to-send (an MU-RTS trigger), and a trigger for polling client stations 154 for buffer status (a buffer status report poll (BSRP) trigger)), etc. In an embodiment, a trigger frame is included in an MPDU.

In some embodiments, the WLAN communication protocol permits multiple MPDUs to be aggregated together to form a MAC data unit called an aggregate MPDU (A-MPDU), which may be included within a single PPDU.

In some embodiments, the WLAN communication protocol permits certain types of trigger frames (trigger MPDUs) to be aggregated within an A-MPDU with data frames (data MPDUs), but does not permit other types of trigger MPDUs to be aggregated within an A-MPDU with data MPDUs. For example, in an embodiment, the WLAN communication protocol permits a basic trigger MPDU to be aggregated in an A-MPDU with a data MPDU, but does not permit an MU-RTS trigger MPDU to be aggregated in an A-MPDU with a data MPDU. In an embodiment, the WLAN communication protocol does not permit an MU-BAR trigger MPDU to be aggregated in an A-MPDU with a data MPDU, and does not permit a beamforming report poll trigger MPDU to be aggregated in an A-MPDU with a data MPDU. In an embodiment, the WLAN communication protocol permits a BSRP trigger MPDU to be aggregated in an A-MPDU with a data MPDU. In another embodiment, the WLAN communication protocol does not permit a BSRP trigger to be aggregated in an A-MPDU with a data MPDU.

In an embodiment, a network interface device (e.g., a MAC processor) is configured to aggregate MPDUs within an A-MPDU, and to encapsulate the A-MPDU within a PPDU. For types of trigger frames that the WLAN communication protocol does not permit to be aggregated with data frames, however, the network interface device (e.g., a MAC processor) is configured to not aggregate such trigger frames with a data frame to form an A-MPDU. For example, for certain types of trigger frames, the network interface device (e.g., the MAC processor) is configured to be prevented from aggregating such trigger frames with a data frame, and/or from including such types of trigger frames within an A-MPDU.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a wireless communication network that operates according to a communication protocol that permits transmissions via multiple channels corresponding to multiple different frequency bandwidths, the method comprising:

determining, at a first communication device that has a first transmit power capability, a second transmit power capability of a second communication device;

receiving, at the first communication device, a packet from the second communication device via a first communication channel that spans a first frequency bandwidth permitted by the communication protocol;

determining, at the first communication device and based on i) the first transmit power capability of the first communication device and ii) the second transmit power capability of the second communication device, a second communication channel for transmitting an acknowledgment packet to the second communication device, the second communication channel spanning a second frequency bandwidth that is narrower than the first frequency bandwidth, the acknowledgment packet responsive to receiving the packet, wherein determining the second communication channel includes selecting, at the first communication device and based on i)

the first transmit power capability of the first communication device and ii) the second transmit power capability of the second communication device, the second frequency bandwidth, from among the multiple different frequency bandwidths permitted by the communication protocol; and transmitting, by the first communication device, the acknowledgment packet to the second communication device via the second communication channel.

2. The method of claim 1, wherein determining that the first communication device is to transmit the acknowledgment packet via the second communication channel comprises:

selecting, at the first communication device, the second frequency bandwidth as a bandwidth that was previously used by the first communication device to successfully transmit a previous packet to the second communication device via the first communication channel.

3. The method of claim 1, wherein:

the communication protocol defines multiple different modulation and coding schemes (MCSs) corresponding to different data rates;

the communication protocol defines a rule regarding which MCS to use when transmitting acknowledgments;

the rule regarding the MCS to use when transmitting acknowledgments indicates a first MCS to use for transmitting the acknowledgment packet;

the method further comprises determining, at the first communication device, that the first communication device is to transmit the acknowledgment packet using a second MCS that corresponds to a lower data rate than the first MCS; and transmitting the acknowledgment packet includes using the second MCS to transmit the acknowledgment packet.

4. The method of claim 3, wherein determining that the first communication device is to transmit the acknowledgment packet using the second comprises:

selecting, at the first communication device, the second MCS, from among the multiple different MCSs defined by the communication protocol, based on the first transmit power capability of the first communication device.

5. The method of claim 4, wherein:

selecting the second MCS, from among the multiple different MCSs defined by the communication protocol is further based on the second transmit power capability.

6. The method of claim 3, wherein determining that the first communication device is to transmit the acknowledgment packet using the second MCS comprises:

selecting, at the first communication device, the second MCS as an MCS that was previously used by the first communication device to successfully transmit a previous packet to the second communication device that transmitted the packet via the first communication channel.

7. The method of claim 3, wherein:

receiving, at the first communication device, an indication that the acknowledgment packet is to be transmitted using the second MCS, the indication having been transmitted by the second communication device; and determining that the first communication device is to transmit the acknowledgment packet using the second MCS comprises:

selecting, at the first communication device, the second MCS, from among the multiple different MCSs defined by the communication protocol, responsive to the indication received from the second communication device.

8. An apparatus in a wireless communication network that operates according to a communication protocol that permits transmissions via multiple channels corresponding to multiple different frequency bandwidths, the apparatus comprising:

a network interface device of a first communication device that has a first transmit power capability, wherein the network interface device includes one or more integrated circuits (ICs) configured to:

determine a second transmit power capability of a second communication device, in connection with the first communication device receiving a packet from a second communication device via a first communication channel that spans a first frequency bandwidth permitted by the communication protocol, determine a second communication channel for transmitting an acknowledgment packet to the second communication device based on i) the first transmit power capability of the first communication device and ii) the second transmit power capability of the second communication device, the second communication channel spanning a second frequency bandwidth that is narrower than the first frequency bandwidth, the acknowledgment packet responsive to receiving the packet, wherein determining the second communication channel includes selecting, based on i) the first transmit power capability of the first communication device and ii) the second transmit power capability of the second communication device, the second frequency bandwidth, from among the multiple different frequency bandwidths permitted by the communication protocol, and transmit the acknowledgment packet to the second communication device via the second communication channel.

9. The apparatus of claim 8, wherein the one or more ICs are configured to:

select the second frequency bandwidth as a bandwidth that was previously used by the network interface device to successfully transmit a previous packet to the second communication device via the first communication channel.

10. The apparatus of claim 8, wherein:

the communication protocol defines multiple different modulation and coding schemes (MCSs) corresponding to different data rates;

the communication protocol defines a rule regarding which MCS to use when transmitting acknowledgments;

the rule regarding the MCS to use when transmitting acknowledgments indicates a first MCS to use for transmitting the acknowledgment packet;

the one or more ICs are further configured to:

determine that the acknowledgment packet is to be transmitted using a second MCS that corresponds to a lower data rate than the first MCS, and use the second MCS to transmit the acknowledgment packet.

11. The apparatus of claim 10, wherein the one or more ICs are further configured to:
select the second MCS, from among the multiple different MCSs defined by the communication protocol, based on the first transmit power capability of the first communication device.

12. The apparatus of claim 11, wherein the one or more ICs are further configured to:
select the second MCS, from among the multiple different MCSs defined by the communication protocol, further based on the second transmit power capability.

13. The apparatus of claim 10, wherein the one or more ICs are further configured to:
select the second MCS as an MCS that was previously used by the network interface device to successfully transmit a previous packet to the second communication device.

14. The apparatus of claim 10, wherein the one or more ICs are further configured to:
receive an indication that the acknowledgment packet is to be transmitted using the second MCS, the indication having been transmitted by the second communication device; and
select the second MCS, from among the multiple different MCSs defined by the communication protocol, responsive to the indication received from the second communication device.

15. A method in a wireless communication network that operates according to a communication protocol that permits transmissions via multiple channels corresponding to multiple different frequency bandwidths, the method comprising:
receiving, at a first communication device that has a first transmit power capability, an indication of a second transmit power capability of a second communication device;
determining, at the first communication device and based on i) the first transmit power capability of the first communication device and ii) the indication of the second transmit power capability of the second communication device, a first frequency bandwidth that the second communication device is to use for transmitting an acknowledgment packet for acknowledging a packet that spans a second frequency bandwidth, of the multiple different frequency bandwidths permitted by the communication protocol, that is wider than the first frequency bandwidth, including selecting, at the first communication device and based on i) the first transmit power capability of the first communication device and ii) the second transmit power capability of the second communication device, the first frequency bandwidth from among the multiple different frequency bandwidths permitted by the communication protocol;
transmitting, by the first communication device to the second communication device, an indication of the first frequency bandwidth that the second communication device is to use for transmitting the acknowledgment packet; and
transmitting, by the first communication device to the second communication device, the packet via the second frequency bandwidth.

16. An apparatus in a wireless communication network that operates according to a communication protocol that permits transmissions via multiple channels corresponding to multiple different frequency bandwidths, comprising:
a network interface device of a first communication device that has a first transmit power capability, wherein the network interface device includes one or more integrated circuits (ICs) configured to:
receive an indication of a second transmit power capability of a second communication device,
determine, based on i) the first transmit power capability of the first communication device and ii) the indication of the second transmit power capability of the second communication device, a first frequency bandwidth, of the multiple different frequency bandwidths permitted by the communication protocol, that the second communication device is to use for transmitting an acknowledgment packet for acknowledging a packet that spans a second frequency bandwidth, of the multiple different frequency bandwidths permitted by the communication protocol, that is wider than the first frequency bandwidth, including selecting, based on i) the first transmit power capability of the first communication device and ii) the second transmit power capability of the second communication device, the first frequency bandwidth from among the multiple different frequency bandwidths permitted by the communication protocol,
transmit, to the second communication device, an indication of the first frequency bandwidth that the second communication device is to use when the second communication device transmits the acknowledgment packet, and
transmit, to the second communication device, the packet via the second frequency bandwidth.

17. The method of claim 1, further comprising:
comparing, at the first communication device, the first transmit power capability of the first communication device with the second transmit power capability of the second communication device;
wherein selecting the second frequency bandwidth comprises selecting the second frequency bandwidth based on the comparing of the first transmit power capability of the first communication device with the second transmit power capability of the second communication device.

18. The method of claim 17, wherein:
comparing the first transmit power capability of the first communication device with the second transmit power capability of the second communication device comprises determining a difference between the first transmit power capability of the first communication device with the second transmit power capability of the second communication device; and
wherein selecting the second frequency bandwidth based on the comparing of the first transmit power capability of the first communication device with the second transmit power capability of the second communication device comprises selecting the second frequency bandwidth based on the difference between the first transmit power capability of the first communication device and the second transmit power capability of the second communication device.

19. The apparatus of claim 8, wherein the one or more ICs are configured to:
compare the first transmit power capability of the first communication device with the second transmit power capability of the second communication device; and
select the second frequency bandwidth based on the comparing of the first transmit power capability of the first communication device with the second transmit power capability of the second communication device.

20. The apparatus of claim 19, wherein the one or more ICs are configured to:
- compare the first transmit power capability of the first communication device with the second transmit power capability of the second communication device at least by determining a difference between the first transmit power capability of the first communication device with the second transmit power capability of the second communication device; and
- select the second frequency bandwidth based on the difference between the first transmit power capability of the first communication device and the second transmit power capability of the second communication device.

21. The method of claim 15, further comprising:
- comparing, at the first communication device, the first transmit power capability of the first communication device with the second transmit power capability of the second communication device;
- wherein selecting the first frequency bandwidth comprises selecting the first frequency bandwidth based on the comparing of the first transmit power capability of the first communication device with the second transmit power capability of the second communication device.

22. The method of claim 21, wherein:
- comparing the first transmit power capability of the first communication device with the second transmit power capability of the second communication device comprises determining a difference between the first transmit power capability of the first communication device with the second transmit power capability of the second communication device; and
- wherein selecting the first frequency bandwidth based on the comparing of the first transmit power capability of the first communication device with the second transmit power capability of the second communication device comprises selecting the first frequency bandwidth based on the difference between the first transmit power capability of the first communication device and the second transmit power capability of the second communication device.

23. The apparatus of claim 16, wherein the one or more ICs are configured to:
- compare the first transmit power capability of the first communication device with the second transmit power capability of the second communication device; and
- select the first frequency bandwidth based on the comparing of the first transmit power capability of the first communication device with the second transmit power capability of the second communication device.

24. The apparatus of claim 23, wherein the one or more ICs are configured to:
- compare the first transmit power capability of the first communication device with the second transmit power capability of the second communication device at least by determining a difference between the first transmit power capability of the first communication device with the second transmit power capability of the second communication device; and
- select the first frequency bandwidth based on the difference between the first transmit power capability of the first communication device and the second transmit power capability of the second communication device.

* * * * *